（12）United States Patent
Ybanez Zepeda (10) Patent No.: US 9,092,874 B2
(45) Date of Patent: Jul. 28, 2015

(54) METHOD FOR DETERMINING THE MOVEMENTS OF AN OBJECT FROM A STREAM OF IMAGES

(75) Inventor: José Alonso Ybanez Zepeda, Paris (FR)

(73) Assignee: Ayotle, Paris (FR)

( * ) Notice: Subject to any disclaimer, the term of this patent is extended or adjusted under 35 U.S.C. 154(b) by 91 days.

(21) Appl. No.: 13/991,368

(22) PCT Filed: Nov. 30, 2011

(86) PCT No.: PCT/EP2011/071348
§ 371 (c)(1),
(2), (4) Date: Jul. 23, 2013

(87) PCT Pub. No.: WO2012/072664
PCT Pub. Date: Jun. 7, 2012

(65) Prior Publication Data
US 2013/0315554 A1    Nov. 28, 2013

(30) Foreign Application Priority Data
Dec. 3, 2010    (FR) .................................... 10 60074

(51) Int. Cl.
*H04N 5/765*    (2006.01)
*G06T 7/20*    (2006.01)
*H04N 5/14*    (2006.01)

(52) U.S. Cl.
CPC    *G06T 7/20* (2013.01); *H04N 5/144* (2013.01); *G06T 2207/10016* (2013.01)

(58) Field of Classification Search
None
See application file for complete search history.

(56) References Cited

U.S. PATENT DOCUMENTS

| 2009/0203403 A1* | 8/2009 | Gidron et al. ................. 455/557 |
| 2010/0020175 A1* | 1/2010 | Takada .......................... 348/148 |
| 2011/0102568 A1* | 5/2011 | Bonnet ............................ 348/77 |

FOREIGN PATENT DOCUMENTS

WO    97/49061 A1    12/1997

OTHER PUBLICATIONS

K. Yamaoka, et al., "Image Segmentation and Pattern Matching Based FPGA/ASIC Implementation Architecture of Real-Time Object Tracking," Design Automation, 2006; Asia and South Pacific Conference; Jan. 24, 2006; Piscataway, NJ; pp. 176-181 (6 pages).
International Search Report issued in PCT/EP2011/071348, dated Apr. 5, 2012, with translation (6 pages).

(Continued)

*Primary Examiner* — William C Vaughn, Jr.
*Assistant Examiner* — Eileen Adams
(74) *Attorney, Agent, or Firm* — Osha Liang LLP (57) ABSTRACT

According to one aspect, the invention relates to a system for determining the movements of an object from a stream of images of said object. The system includes, in particular, a computer having a memory and a central processing unit, said central processing unit including: a reading unit (12) for recording each image of the stream of images in an input buffer memory (22); a processing unit (13) making it possible to determine, for each image, a change in the position and/or in the deformation of said object relative to the image immediately preceding said image in the stream; the reading and processing units being synchronized such that the processing of each of said images of the stream of images is carried out either simultaneously at the time of the reading of an image following said image in the stream of images, and of the recording thereof in the input buffer memory (22).

15 Claims, 4 Drawing Sheets

(56) References Cited

OTHER PUBLICATIONS

Written Opinion issued in PCT/EP2011/071348, dated Apr. 5, 2012 (7 pages).

Office Action issued in corresponding European Patent Application No. 11802866.1, mailed Jun. 27, 2014 (4 pages).

Ramamoorthy et al.; "Pipeline Architecture"; Computing Surveys, vol. 9, No. 1, Mar. 1977 (42 pages).

Office Action dated Apr. 28, 2015 in corresponding European Patent Application No. 11802866.1 (5 pages).

M. Fleury et al., "A Real-Time Parallel Image-Processing Model", IEE Conference Publication No. 443, IPA97, 174-178, 1997.

* cited by examiner

METHOD FOR DETERMINING THE MOVEMENTS OF AN OBJECT FROM A STREAM OF IMAGES

DOMAIN OF THE INVENTION

The present invention relates to the domain of image processing. More precisely, the invention relates to the determination of the movements of an object in a stream of images.

PRIOR ART

The determination of the movements of an object in a stream of images, and more particularly of an animated object, such as a face, has applications notably in the animation of avatars for the implementation, for example, of video games and cinematographic films.

One of the main technical issues in such applications is the achievement of a sufficient level of realism to avoid, for example, causing discomfort for the viewers or users during the transposition of the movements of real faces into movements of faces of virtual persons.

Current methods are based on manual animation techniques which consist in implementing the transposition using professional artists. Movement capture devices are also known which use video image processing, but which require the precise positioning of markers, for example, on the face of the person whose movements are sought to be determined. Devices of this type are marketed, for example, under the brand name Vicon®.

The operation of placing markers on the face is lengthy and critical to the continuing processing and ways are being sought to eliminate this operation. A method for tracking facial movements without markers has recently been proposed in "*Face tracking using canonical correction analysis. In International Conference on Computer Vision Theory and Applications*, pages 396-402, Barcelona, Spain, March 2007". However, the published method does not make it possible to achieve a processing speed which is satisfactory for professional use.

The present invention aims to provide a method for determining the movements of an object, and more particularly of a face, in a stream of images, without using markers and suitable for working in real time.

SUMMARY OF THE INVENTION

For this purpose, according to a first aspect, the invention proposes a method for determining the movements of an object, and more particularly of a face, contained in a stream of images. The method comprises a step of recording an image of the stream of images in a buffer memory and a step of processing of the image by a processing unit. The processing comprises the determination of a change in the position and/or the deformation of the object relative to an image preceding the image in the stream of images. The image processing step is carried out simultaneously with a step of recording an image following said image in the stream of images.

The proposed method enables notably an improvement in the performance and notably in the processing speed through the parallelization of the recording and processing operations. The method also enables the capacities of the multicore processors to be fully exploited, thereby achieving the animation of virtual objects or persons in real time.

In one embodiment, the method further comprises a step of transmission to a control unit of information relating to the recording of the image in the buffer memory, a step of transmission by the control unit of processing start instruction to the processing unit and a step of transmission to the control unit of information relating to the end of the processing of the image by the processing unit. The processing is carried out following the reception by the processing unit of the processing instruction. The processing instruction is transmitted after the control unit has received the information relating to the end of the processing of the image preceding said image in the stream and the information relating to the recording of said image.

This enables a better synchronization of the processing by means of the control unit. The transmission of information relating to the end of the processing to the control unit notably avoids the transmission of instructions to the processing unit while the latter cannot respond as it is busy carrying out the processing of an image. Thus, the monitoring of the processing unit by a control unit enables an improvement in performance. Moreover, the method enables the potential addition of one or more auxiliary processing units without modifying the operation of the processing unit. The modular execution facilitates extendibility. The control unit operates as an interface, and an auxiliary unit capable of interworking with the control unit can be added without modifying the interactions between the other elements.

In one embodiment, the method further comprises a step of auxiliary processing prior to the (main) processing of the image.

This improves the quality of the images and facilitates the subsequent processing of the images at the output of the auxiliary processing.

In one embodiment, the method comprises a step of recording an image from the stream of images in an input buffer memory by a reading unit, and a step of auxiliary processing of the image by the auxiliary processing unit. The step of auxiliary processing of the image is carried out simultaneously with the step of recording an image following said image in the stream of images.

This notably improves performance through the parallelization of the recording and auxiliary processing operations.

In one embodiment, the method further comprises a step of transmission by the reading unit to the control unit of information relating to the recording of the image in the input buffer memory, and a step of transmission by the control unit of an auxiliary processing start instruction to the auxiliary processing unit. The auxiliary processing is carried out following the reception by the auxiliary processing unit of the auxiliary processing start instruction, said instruction being transmitted after the control unit has received the information relating to the recording of said image.

This enables a better synchronization by the control unit. This furthermore places the operation of the auxiliary processing unit under the single control of the control unit and allows the auxiliary processing unit to be developed independently from the processing unit. This also avoids the transmission of instructions to the auxiliary processing unit when the latter cannot respond because it is busy carrying out an auxiliary processing operation. Performance management is thus improved.

In one embodiment, the method further comprises a step of transmission to the control unit of information relating to the end of the auxiliary processing of the image by the auxiliary processing unit. The instruction transmission step is carried out after the control unit has received the information relating to the end of the auxiliary processing of the image preceding said image in the stream.

This allows the processing of an image to be performed according to the result of the auxiliary processing of an image preceding said image in the stream.

The auxiliary processing may comprise, for example, an equalization of the contrast and/or a correction of aberrations in the images to compensate for imperfections due, for example, to a capture of the images in a non-uniform lighting. It may also comprise the detection of characteristic points, the conversion of color images into grayscale images, the conversion into binary images, filtering, etc.

If a plurality of input buffer memories are available for the recording of the images, the method may further comprise a step of allocation of the input buffer memory by the control unit. The auxiliary processing start instruction comprises information relating to the allocated buffer memory.

This allows the processing to be carried out from a plurality of video sources.

In one embodiment, the processing start instruction comprises a reactivation instruction if the processing unit is on standby.

In one embodiment, the auxiliary processing start instruction comprises a reactivation instruction if the auxiliary processing unit is on standby.

This enables the processing unit and/or the auxiliary processing unit to be stimulated so that it is available to process an image. The switch to standby of the processing unit and/or the auxiliary processing unit may be due to a difference in speed between the recording of the images in the buffer memory and the processing of the images. For example, if the images originate from a high-definition camera, the recording of the images may be a longer step than the processing and/or the auxiliary processing and the corresponding processing unit may switch to standby between the processing of two successive images.

In one embodiment, the stream of images originates from a video camera or a data storage unit.

In one embodiment, the method further comprises the construction of a result image on the basis of the change in the position and/or the deformation of the object determined in said image and the display of the result image.

In the case of the determination of the movements of a face, this allows, for example, the determination of the change in the position and/or expression of the face in the stream of images to be used to construct images comprising virtual persons reproducing the movements of the face. The determination of the movements of the face may also enable the animation of a mask, the morphology of which is adapted to the face and which is superimposed on the face in the image. This allows, for example, an image to be produced including a mask which reproduces the movements of the face contained in the stream of images. For example, the result image may also superimpose such a mask and said face.

According to a second aspect, the invention proposes a computer program product adapted to carry out the previously described method.

According to a third aspect, the invention proposes a system for carrying out the method according to the first aspect.

According to one variant, the system comprises a computer with a memory and a central processing unit, said central unit comprising a plurality of calculation units to carry out the method.

For example, the central unit is a multicore processor.

BRIEF DESCRIPTION OF THE FIGURES

Other characteristics and advantages of the invention will become evident from a reading of the description which follows, illustrated by the figures, in which.

DETAILED DESCRIPTION

Figure 1:
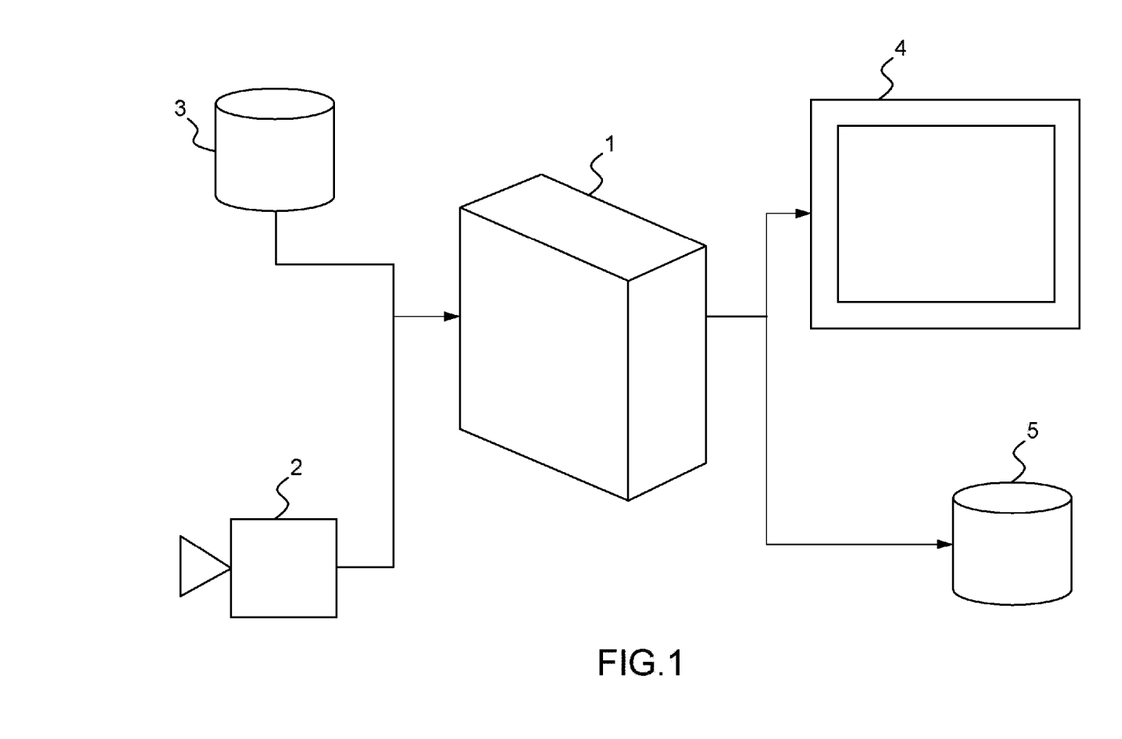
FIG. 1 shows a system for carrying out the invention in one embodiment.

FIG. 1 generally shows a system for implementing the invention according to one embodiment. According to this example, the system comprises a computer 1, a video camera 2, a first computer data storage unit 3 (for example an external hard disk reader or a USB stick), a display unit 4 and a second computer data storage unit 5 (for example, a hard disk writer). The computer 1 generally comprises a central computer data processing unit, a hard disk and a memory card (not shown).

A stream of raw images originating from the video camera 2 and/or the first computer data storage device 3 is processed by the central processing unit and a stream of result images, obtained on the basis of the processing of the stream of raw images, can be displayed on the display unit 4 and/or stored in the second storage unit 5. The stream of raw images may also originate from a stream recovered from a server via a computer network, Internet network or local network. The same applies to the stream of result images. The images of the stream of raw images contain a face, the movements of which are sought to be determined in a three-dimensional space.

Figure 2:
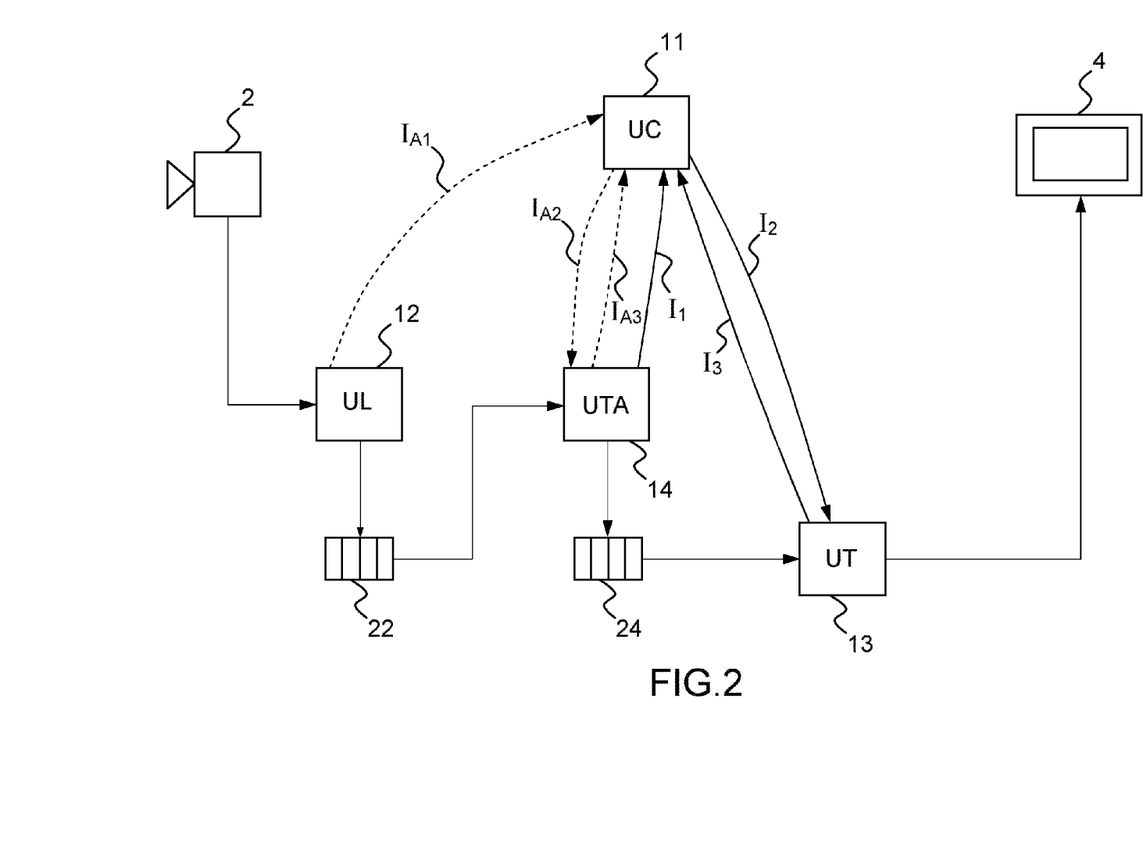
FIG. 2 shows a summary of the steps carried out according to an alternative embodiment of the method according to the invention.

FIG. 2 shows a summary of the processing of the stream of raw images by the central computer data processing unit according to one example embodiment. The central processing unit is advantageously a multicore processor comprising a set of computing units burnt onto the same chip to which a certain number of functions have been assigned (UL, UC, UTA, UT). According to one variant, each calculation unit can be burnt onto an independent electronic card.

Among the calculation units, a control unit 11 enables the synchronization of the other calculation units. In the example shown in FIG. 2, the control unit coordinates the operation of a reading unit 12, a processing unit 13 for the main processing of the images and an auxiliary processing unit 14.

In the example shown in FIG. 2, the reading unit 12 performs the reading and recording of the raw images captured by the video camera 2 in an input buffer memory 22. The stream of raw images originating from the camera 2 forms a video sequence of successive images. The reading unit 12 informs the control unit 11 of the recording of each new image via the transmission of information $I_{A1}$ to the control unit 11. This notably enables the control unit 11 to control the reactivation of the auxiliary processing unit 14. Indeed, if the recording of the images is longer than the processing of the images, for example when the images originate from high-definition cameras, the auxiliary processing unit 14 may switch by default to a standby mode in order to enable other programs to access the calculation capacities of the central processing unit.

The auxiliary processing unit 14 processes the stream of raw images in parallel with the recording of the raw images in the input buffer memory 22. The control unit 11 controls the auxiliary processing unit 14 via the transmission of an auxiliary processing start instruction $I_{A2}$. The instruction $I_{A2}$ is transmitted following the reception by the control unit 11 of the information $I_{41}$ relating to the recording of the raw image. The auxiliary processing unit 14 informs the control unit 11 of the end of the auxiliary processing of the raw image by sending information $I_{43}$ relating to the end of the auxiliary processing. The processing of the raw images is successive and the processing of an image is carried out after the control unit 11 has received the information relating to the end of the auxiliary processing of the raw image directly preceding said raw image in the stream.

One of the aims of the auxiliary processing unit may be to improve the quality of the raw images before the main processing by the processing unit 13. For example, the auxiliary processing unit 14 may equalize the contrast of the raw images and/or eliminate aberrations due to the camera. The auxiliary processing may also comprise the calculation of the histogram of an image, the detection of characteristic points, the conversion of color images into grayscale images, the conversion into binary images, a filtering step or any other conventional step in image processing. Alternatively, the auxiliary processing may enable the sequencing of the processing steps so that each processing step is not longer than the recording step.

The sequence of the images of the stream of images at the output of the auxiliary processing unit 14 (also referred to as the stream of images in the application) thus corresponds to the sequence of the images of the stream of raw images. After the treatment, the auxiliary processing unit 14 records the image of the stream of images thus processed in a buffer memory 24 and transmits information $I_1$ relating to the recording to the control unit 11 which will be able to send the processing start instruction $I_2$ to the main processing unit 13 as soon as the processing unit 13 is available.

According to one variant, there is no auxiliary processing and the main processing is carried out directly on the stream of raw images, each image being previously read and recorded by the reading unit in the input buffer memory 22. In this case, the control unit performs the synchronization of the reading unit 12 and the processing unit 13. Alternatively, the reading and processing units reciprocally synchronize one another without the need for a control unit.

According to a different variant, there may be a plurality of auxiliary processing units to pre-process the images before the main processing. This may enable, for example, the processing time of each image by each processing unit to be limited to a period of less than or equal to the reading and recording time of an image originating from the stream of raw images and thus real-time operation to be performed. In this case, the control unit synchronizes the reading unit and all of the auxiliary and main processing units to perform the parallel recording of the images from the stream of raw images, the auxiliary processing and the main processing.

The main processing 13 comprises the determination of a change in the position and/or the deformation of an object relative to an image directly preceding said image in the stream of images. This may involve, for example, the determination of the position and/or the change in the expression of a face.

In a phase prior to the carrying out of the method, a three-dimensional geometric model (also referred to as a mask in the present application) may be superimposed on a reference image containing the object, for example a face, the movements of which is sought to be followed, and a learning step is carried out. The learning step consists in producing a correspondence matrix which associates disturbances of the position and/or the expression of the mask with texture variations between the portion of the reference image located under the mask in the state superimposed on the face and the portion of the reference image located under the mask in the disturbed state.

For example, the superimposition on the reference image can be carried out manually by a user. The superimposition on the face may comprise a parameterization which allows the three-dimensional mask to be adapted to the morphology of the face of which the movements are sought to be tracked. For example, the three-dimensional polygonal mask may notably provide that the vertical position of the eyebrows, nose and mouth and the distance between the eyes are parameterized for the face which is sought to be tracked.

The processing is then carried out through recursion, on the basis of an image in which the mask is superimposed on the face, and by estimating the change in the position and/or expression relative to the preceding image on the basis of the correspondence matrix.

More details on the processing methods that can be carried out are given, for example, in "*Linear tracking of pose and facial features. In* 10*th IAPR Conference on Machine Vision Applications*, Tokyo, Japan, May 2007".

The processing unit 13 processes an image recorded in the buffer memory on receiving processing start information $I_2$ originating from the control unit 12. Following the processing, the processing unit 13 informs the control unit 12 via the transmission of information $I_3$ relating to the end of the processing. The processing unit 13 processes the stream of images in parallel with the recording of the raw images and the auxiliary processing.

The processing unit 13 may also construct and display on the display unit 4 a result image including, for example, a superimposition of the processed image and the mask, the position and expression of which are modified according to the position and expression determined by the processing. In one embodiment, the result image may also be stored in the second computer data storage unit 5.

Figure 3:
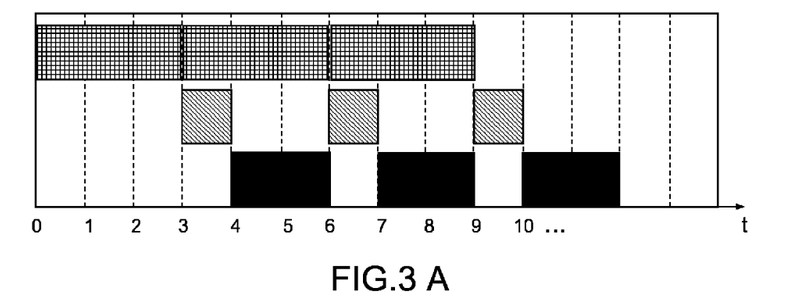
FIGS. 3A to 3C show timing charts illustrating the synchronization of steps of the method according to different embodiments.

FIGS. 3A to 3C show timing charts of the steps of recording E1, auxiliary processing E2 and processing E3 for consecutive images of the stream of raw images, according to three examples. The step E1 (indicated by squares) comprises the capture of raw images by the camera 2 and the recording of the raw images in the input buffer memory 22. The step E2 (indicated by hatching) comprises the auxiliary processing of the raw images and the recording in the buffer memory 24. The step E3 (indicated by the solid black shading) comprises the main processing of the images. The steps E1-E3 are carried out in parallel, i.e. in a synchronous manner. The main processing E1 of an image is consecutive to the auxiliary processing E2 of the corresponding raw image and is carried out after the image preceding said image has been processed. The auxiliary processing of a raw image is consecutive to the recording of said raw image in the input buffer memory.

In the example shown in FIG. 3A, the cumulative processing time of the processing steps E2 and E3 is not greater than the recording step E1.

Consequently, the processing of an image is carried out during the recording of the image directly following it in the stream. Compared with a conventional sequential processing of the steps E1-E3, in which the recording of an image is carried out only after the processing of the image preceding it is finished, the processing in parallel of the steps E1-E3 in the example shown in FIG. 3A allows the processing of the third image to be ended six time units earlier.

In the example shown in FIG. 3B, the cumulative processing time of the processing steps E2 and E3 is longer than the recording step E1 but the time of each of the steps E2 and E3 is shorter or the same.

Consequently, an overflow is observed, the main processing E3 of an image being carried out during the end of the recording of the image directly following it in the stream and the start of the recording of the image after the image directly following it. However, the processing continues to be carried out in real time, and compared with a sequential processing, the parallel processing in the example shown in FIG. 3B allows the processing of the third image to be ended 13 time units earlier.

In the example shown in FIG. 3C, the auxiliary processing step E2 is shorter than the recording step E1, but the main processing step E3 is longer than the recording step E1. In this case, a shift in the processing of the images relative to the recording, and, consequently, the accumulation of a delay, are observed. Even in this example, although the parallel processing enables the processing of the third image to be ended 12 time units earlier than a sequential processing, this configuration is less favorable than that of the examples 3A and 3B, and the main processing could be divided into a second auxiliary processing and a new main processing, in such a way that each processing step is shorter than the recording step.

Figure 4A:
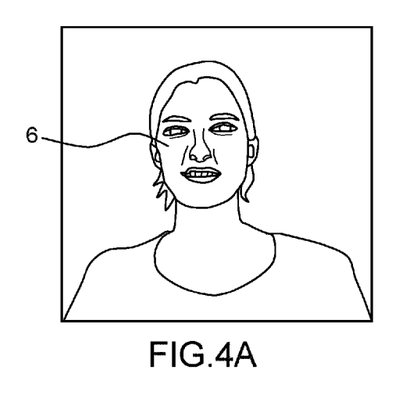
FIGS. 4A-4D show two images of a face and two result images constructed on the basis of the position and expression of the face determined in said images of the face.
Figure 4B:
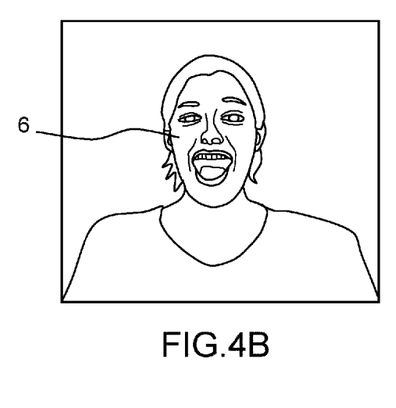
Figure 4C:
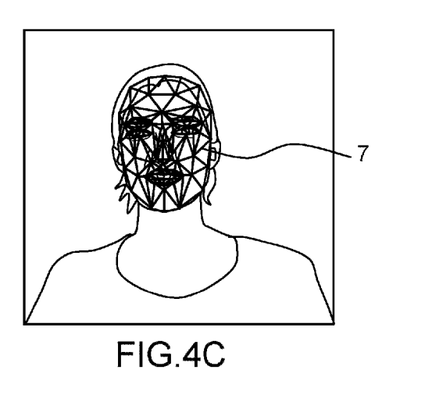
Figure 4D:
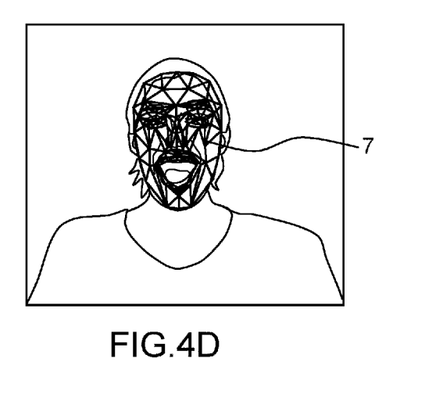

FIGS. 4A and 4B show two images of the stream of images containing a face 6 and FIGS. 4B and 4D show two result images respectively constructed on the basis of the determination of the position and the expression of the face 6 in the images 4A-B. In the images 4C and 4D, a mask 7 is superimposed on the face 6. The mask 7 reproduces the expression of the face 6. The mask 7 may be the three-dimensional mask used to determine the change in the position and the expression of the face 6 according to the previously described method. In a different embodiment, the determination of the position and the expression of the face of a real person enables a mask of a virtual person to be animated. A mask of this type may be obtained through a deformation of the three-dimensional mask used to determine the change in the position and the expression of the face of the real person. In such an embodiment, a result image may be constructed by displaying the mask of the virtual person in the position and the expression determined for the real person. A realistic animation of the virtual person is thus obtained in real time.

Although described by way of a certain number of embodiments, the method and the system according to the invention comprise different variants, modifications and refinements which will appear in an evident manner to the person skilled in the art, on the understanding that these different variants, modifications and refinements form part of the scope of the invention as defined by the claims which follow.

The invention claimed is:

1. A method carried out by a computer for determining movements of an object from a stream of images of said object, comprising for each image of the stream of images:
   recording said image in an input buffer memory;
   processing said image by a processing unit, the processing comprising the determination of a change in position and/or deformation of said object relative to an image directly preceding said image in the stream; and
   synchronizing the recording and processing steps in such a way that the processing of an image is carried out simultaneously with the recording of an image following said image in the stream of images,
   wherein the synchronizing step comprises:
      transmitting to a control unit information relating to the recording of an image in the input buffer memory and to an end of processing of an image; and
      transmitting by said control unit instructions relating to a start of processing of an image, a processing start instruction being transmitted to start the processing of an image following the reception of the information relating to the recording of said image and the reception of the information relating to an end of processing of the image directly preceding said image in the stream of images.

2. The method as claimed in claim 1, wherein the processing start instruction comprises a reactivation instruction if the processing unit is on standby.

3. The method as claimed in claim 1, further comprising a step of auxiliary processing by an auxiliary processing unit, prior to the processing step, said auxiliary processing step comprising for each image of the stream of images:
   the reading of said image in the input buffer memory,
   the pre-processing of said image,
   the recording in an auxiliary buffer memory of said pre-processed image with a view to its processing;
   the method further comprising:
   the synchronization by a control unit of the steps of recording in the input buffer memory and of auxiliary processing in such a way that the auxiliary processing of an image is carried out simultaneously with the recording of an image following said image in the stream of images.

4. The method as claimed in claim 3, in which the synchronization further comprises:
   the transmission to said control unit of information relating to the end of auxiliary processing of an image;
   the transmission by said control unit of instructions relating to the auxiliary processing start, an auxiliary processing start instruction being transmitted to start the auxiliary processing of an image following the reception of the information relating to the recording of said image in the input buffer memory and the reception of the information relating to the end of auxiliary processing of the image directly preceding said image in the stream of images.

5. The method as claimed in claim 4, in which the processing start instruction comprises a reactivation instruction if the auxiliary processing unit is on standby.

6. The method as claimed in claim 3, further comprising at least a second step of auxiliary processing by a second auxiliary processing unit, said second auxiliary processing step comprising, for each image of the stream of images:
   the reading of said image in the auxiliary buffer memory,
   the pre-processing of said image,
   the recording in a second auxiliary buffer memory of said pre-processed image with a view to its processing; and
   the synchronization by the control unit of the second auxiliary processing step in such a way that the second auxiliary processing of an image is carried out simultaneously with the recording in the input buffer memory of an image following said image in the stream of images.

7. The method as claimed in claim 1, further comprising the construction of a result image on the basis of the change in the position and/or the deformation of the object determined in said image and the display of the result image.

8. The method as claimed in claim 1, wherein the stream of images originates from a video camera or a data storage unit.

9. The method as claimed in claim 1, wherein the images comprise images of a face and the processing comprises the determination of a change in the position and/or the expression of said face.

10. A tangible non-transitory computer readable medium comprising software instructions embodied therein for causing a computer system to perform a method for determining the movements of an object from a stream of images of said object, comprising for each image of the stream of images, the method comprising:

recording said image in an input buffer memory;

processing said image by a processing unit, the processing comprising the determination of a change in position and/or deformation of said object relative to an image directly preceding said image in the stream; and synchronizing the recording and processing steps in such a way that the processing of an image is carried out simultaneously with the recording of an image following said image in the stream of images, wherein the synchronizing step comprises:

transmitting to a control unit information relating to the recording of an image in the input buffer memory and to an end of processing of an image; and transmitting by said control unit instructions relating to a start of processing of an image, a processing start instruction being transmitted to start the processing of an image following the reception of the information relating to the recording of said image and the reception of the information relating to an end of processing of the image directly preceding said image in the stream of images.

11. A system for determining the movements of an object from a stream of images of said object, comprising a computer with a memory and a central processing unit, said central processing unit comprising:

a reading unit for recording each image of the stream of images in an input buffer memory;

a processing unit enabling, for each image, the determination of a change in the position and/or the expression of the face relative to the image directly preceding said image in the stream; and a control unit for synchronizing the reading unit and processing units in such a way that the processing of each of said images of the stream of images is carried out simultaneously with the reading of an image following said image in the stream of images and its recording in the input buffer memory;

the control unit receiving information relating to the recording of an image in the input buffer memory and to the end of processing of an image; and the control unit transmitting instructions relating to a start of processing of an image, a processing start instruction being transmitted by the control unit to start the processing of an image following the reception of the information relating to the recording of said image and the reception of the information relating to an end of processing of the image directly preceding said image in the stream of images.

12. The system as claimed in claim 11, in which a plurality of calculation units further comprises at least one control unit to perform the synchronization of said reading and processing units.

13. The system as claimed in claim 12, in which the plurality of calculation units further comprises at least one auxiliary processing unit enabling, for each image of the stream of images:

the reading of said image in the input buffer memory, the pre-processing of said image, the recording in an auxiliary buffer memory of said pre-processed image with a view to its processing.

14. The system as claimed in claim 12, wherein the central processing unit is a multicore processor, each calculation unit being a calculation unit of said processor.

15. The system as claimed in claim 14, further comprising a video camera or a data storage unit to form the stream of images.

* * * * *